United States Patent [19]
Hunter

[11] 3,774,279
[45] Nov. 27, 1973

[54] RADIUS CUTTER

[76] Inventor: Herbert F. Hunter, 1800 Neptune Way, Sacramento, Calif. 95825

[22] Filed: June 27, 1972

[21] Appl. No.: 266,812

[52] U.S. Cl............ 29/103 R, 29/103 A, 144/134 D
[51] Int. Cl............................. B26d 1/12, B27c 5/00
[58] Field of Search......................... 29/103, 103 A; 144/134 D, 134, 218, 236

[56] References Cited
UNITED STATES PATENTS

| | | | |
|---|---|---|---|
| 1,433,497 | 10/1922 | Carter | 144/134 D |
| 1,630,173 | 5/1927 | Dumont | 144/134 D |
| 331,771 | 12/1885 | Corson | 29/103 |
| 3,289,716 | 12/1966 | Dutot | 144/134 D |
| 3,718,958 | 3/1973 | Brucker | 29/103 R |
| 1,576,645 | 3/1926 | Eskew et al. | 29/103 R X |

*Primary Examiner*—Harrison L. Hinson
*Attorney*—Harry A. Herbert, Jr. et al.

[57] ABSTRACT

A new and improved rotary cutter for cutting a radius on the edges of material requiring either open or closed bevels as well as changing bevels. A tapered guide in the form of a sleeve is located tangent to the lower edge of the shaped cutter teeth allowing the material or tool to tilt relative to one another such that the proper radii can be completely and accurately machined on the material having edges of varying angular configuration with only one or two passes of the cutter.

1 Claim, 6 Drawing Figures

70° BEVEL

80° BEVEL

90° BEVEL

100° BEVEL 3,774,279

RADIUS CUTTER

BACKGROUND OF THE INVENTION

This invention relates to a radius cutter for cutting a precision radius on the edges of material having open and closed bevels, variable changing bevels and 90° bevels. More particularly, the invention is concerned with providing an improved radius cutter wherein a tapered sleeve is positioned tangent to the cutting teeth so that either the tool or material can be tilted to obtain true precision radii on the edges of various shaped and beveled materials by making only one pass of the cutter with a possible second clean-up cut sometimes desirable.

Heretofore, it has been customary to stock a large number of shaped radius cutting tools for use on the various materials having open or closed bevels and changing bevels. Even using the many and varied cutters presently available, it is usually necessary to hand file portions of the radius in order to obtain the true and precise configuration required. Also, many man-hours of work are wasted when it becomes necessary to make several passes over the same edge to obtain a radius within acceptable tolerances. Generally, the presently available radius cutters must be run at relatively low speeds to prevent chatter and overheating thereby adding to the disadvantages of repeated passes over the same area. Thus, it would be most desirable to provide a radius cutter which would be suitable for cutting a true and precise radius on a variety of shaped and beveled materials with just a single pass of the tool and which is specially designed for operation at high speeds without chatter or overheating.

SUMMARY OF THE INVENTION

The present invention is concerned with providing a new and improved radius cutter which is capable of cutting a radius on material that requires either open or closed bevels as well as changing bevels.

Accordingly, it is an object of the present invention to provide an improved radius cutter having a tapered guide extending from the lower edge of the cutting teeth which are undercut to permit the tool to be operated at very high speed without overheating from friction or chatter.

Another object of the invention is to provide a new and improved radius cutter having self-contained cutting teeth to prevent any chance of error.

Still another object of the invention is to provide an improved radius cutter having self sharpening design of cutting teeth allowing the cutter to last indefinitely without resharpening.

A further object of the invention is to provide a radius cutter wherein the lower piloting or guide is tapered at a 10° to 20° angle thereby allowing the radius to be applied in a single pass of the cutter for both open and closed bevels. Formerly a minimum of two or three passes were necessary.

A still further object of the invention is to provide a new and improved radius cutting tool that is economical to make and requires no new or unusual manufacturing techniques to produce in quantity.

These and other objects, features and advantages will become more aparent after considering the following detailed description taken in conjunction with the illustrative embodiment in the accompanying drawings wherein like reference numerals are used throughout to identify like elements.

IN THE DRAWINGS

DESCRIPTION OF A PREFERRED EMBODIMENT

Figure 1:
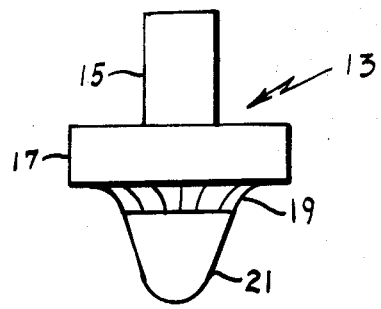
FIG. 1 is a side elevation of a radius cutter according to the invention.
Figure 2:
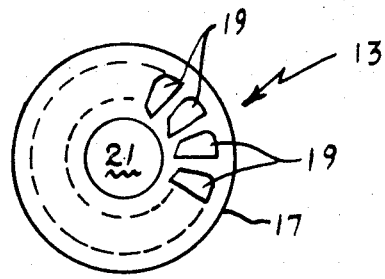
FIG. 2 is a bottom plan view of the embodiment of the radius cutter of FIG. 1.

Referring now to the drawings, the hereinafter disclosed improved radius cutter is designated generally by the reference numeral 13 and includes the elongated solid cylindrical shank portion 15. Preferably, the cutter 13 is manufactured of suitable cutting tool steel. The shank 15 is adapted to be held in a suitable chuck (not shown) for the purpose of driving the cutter 13 about a central longitudinal axis in one direction. A cylindrical body portion 17 is integral with the lower end of the shank 15. Cutting teeth 19 initiate at the lower surface of the body portion 17 and extend downwardly therefrom. A tapered guide portion 21 of reduced diameter and frusto-conical configuration extends downwardly from the lower edges of the cutting teeth 19.

The cutting teeth 19 are formed by milling a series of grooves of substantially triangular cross-section, one side of each groove forming the advance or cutting face of a tooth and the other side forming the rear face of the adjacent tooth. In the particular cutter here shown, the cutting edge of each tooth 19 lies in a plane passing through the axis of the cutter 13. The teeth 19 are given the necessary relief by use of a conventional cam fed tool commonly known as a relieving machine.

Figure 3:
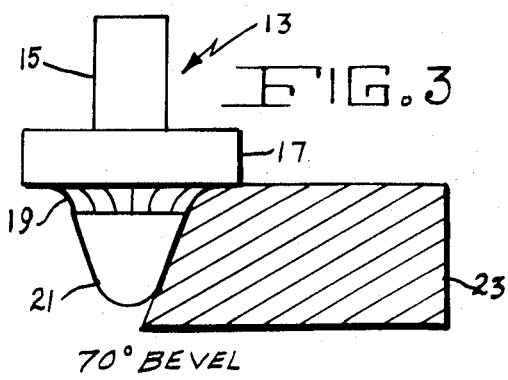
FIG. 3 is a view in side elevation illustrating the operation of cutter on beveled material having a 70° bevel.
Figure 4:
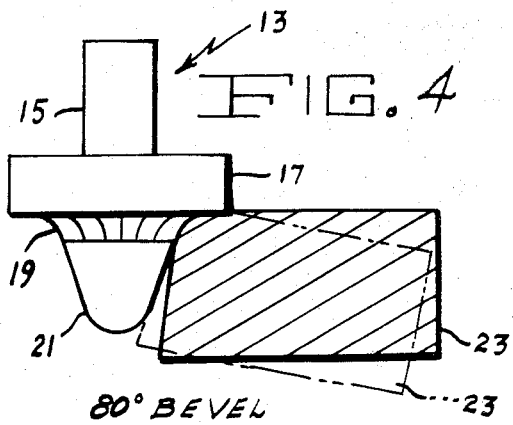
FIG. 4 is a view in side elevation illustrating the cutter with material having an 80° bevel.
Figure 5:
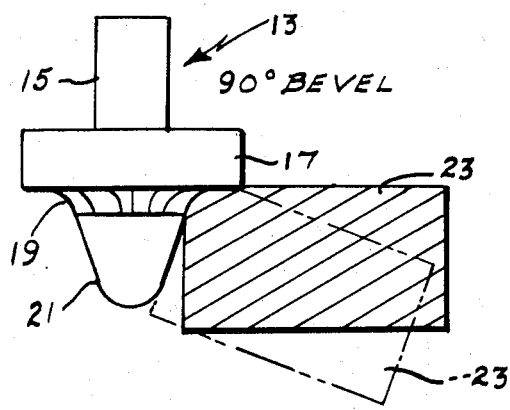
FIG. 5 is a view in side elevation of the cutter with material having a 90° bevel.
Figure 6:
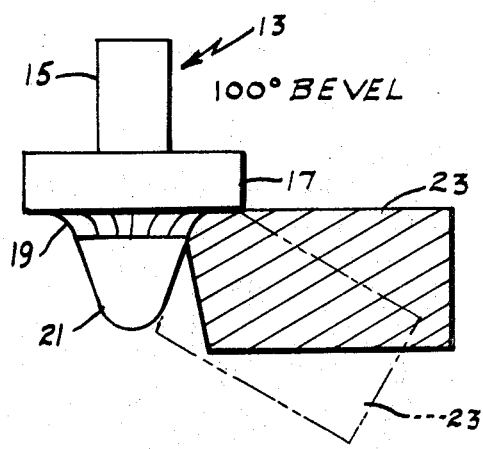
FIG. 6 is a view in side elevation illustrating the cutter in operation on beveled material having a 100° bevel.

In order to cut a pecision radius on the edges of the material or workpiece having open and closed bevels, variable changing bevels, and also 90° bevels, the standard practice is to provide a number of cutters so that each type of bevel can be accommodated. Also, a certain amount of hand filing is necessary even after making several passes with the cutter when radii are machined on some of the variable changing bevels. The tapered guide portion 21 of the herein disclosed arrangement permits the cutter 13 to be used to cut radii on any of a number of different bevels a shown in FIGS. 3–6. In FIG. 3, the material or workpiece 23 is shown with a 70° bevel and a radius is to be applied to the edge. As shown, it can be seen that the radius is cut with a single pass of the cutter. In FIGS. 4, 5 and 6, either the material or the cutter 13 is tilted for clean up cuts on the radius to prevent the necessity of hand filing or of making a greater number of passes of the cutter. The type of driving device used to cut the required radius would normally determine whether the workpiece 23 or the driving device (not shown) was tilted. Thus, it can be seen that the new and improved cutter 23 has the capability of cutting a radius on a workpiece 23 which requires either open or closed bevels as well as changing bevels.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that my invention could have extensive use in machining operations where it is desired to produce beveled workpieces having any of a variety of shaped edges such as angular or concave. This can be accomplished by forming the cutting teeth in accordance with the required finish shaped edge.

Also, it shold be understood that various changes, alterations, modifications and substitutions particularly with respect to the construction details can be made in the arrangement of the several elements without departing from the true spirit and scope of the amended claims.

Having thus described my invention, what I claim and desire to secure by Letters Patent of the United States is:

1. A toothed cutter for cutting a radius on the edge of a beveled workpiece, said cutter comprising an upwardly extending elongated shank portion, a cylindrical body portion on the lower end of said shank portion and integral therewith, a series of shaped cutting teeth initiating at and extending downwardly from said body portion, and a tapered guide of reduced diameter extending downwardly from the lower end of said cutting teeth, said tapered guide being substantially frusto-conical in configuration with the larger diameter being tangent to said cutting teeth and forming an angle with said toothed cutter so that the beveled workpiece and the cutter can be tilted relative to each other to allow complete removal of the required edge material from the workpiece thereby providing the required radius thereon with a minimum number of cutter passes.

* * * * *